United States Patent
Koz et al.

[11] Patent Number: 5,479,405
[45] Date of Patent: Dec. 26, 1995

[54] ADAPTOR BETWEEN ISDN BASIC RATE ACCESS AND SWITCHED-56 ACCESSES

[75] Inventors: Mark C. Koz, 2752 Glorietta Cir., Santa Clara, Calif. 95051; Jack W. Lix, Lake Oswego, Oreg.

[73] Assignee: Mark C. Koz, Santa Clara, Calif.

[21] Appl. No.: 234,314

[22] Filed: Apr. 28, 1994

[51] Int. Cl.[6] .................................................... H04L 12/66
[52] U.S. Cl. .......................... 370/84; 370/94.2; 370/110.1
[58] Field of Search ................................ 370/79, 84, 95.1, 370/55.3, 60, 60.1, 94.1, 94.2, 110.1

[56] References Cited

U.S. PATENT DOCUMENTS

| | | | |
|---|---|---|---|
| 4,979,169 | 12/1990 | Almond et al. | 370/79 |
| 5,251,207 | 10/1993 | Abensour et al. | 370/110.1 |

Primary Examiner—Wellington Chin
Attorney, Agent, or Firm—Donald E. Schreiber

[57] ABSTRACT

The invention is an adaptor which permits using a digital telephone device with an incompatible telephone network access. In its most preferred embodiment, the present invention is an adaptor which permits an ISDN telephone device to exchange digital data with two Switched-56 Access. An ISDN Basic Rate Access interface circuit interfaces with the ISDN telephone device, while two Switched-56 Access interface circuit interfaces with two Switched- 56 Access. The adaptor also includes a clock recovery circuit for synchronizing digital data transfers occurring between the ISDN Basic Rate Access interface circuit and the ISDN telephone device with the digital data transfers occurring between the Switched-56 Access interface circuit and the Switched-56 Access. In an alternative embodiment, the clock recovery circuit synchronizes digital data transfers between the ISDN Basic Rate Access interface circuit and the Switched-56 Access interface circuits rather than conversely as in the preferred embodiments so a Switched-56 telephone device may exchange digital data with an ISDN Basic Rate Access.

4 Claims, 1 Drawing Sheet

ADAPTOR BETWEEN ISDN BASIC RATE ACCESS AND SWITCHED-56 ACCESSES

BACKGROUND OF THE INVENTION

1. Field of the Invention

The present invention relates generally to digital telecommunication services and, more particularly, to interoperability between two mutually incompatible digital telecommunication protocols.

2. Description of the Prior Art

Within the United States and Canada there exists two mutually incompatible protocols for exchanging digital data between computers using digital telecommunications. These two mutually incompatible conventions are respectively called Integrated Services Digital Network ("ISDN") Basic Rate Access and Switched-56 Access. The incompatibility between these two systems is of such a character that a telephone device which communicates using the ISDN protocol cannot exchange data with a Switched-56 Access. Conversely, a telephone device that communicates using the Switched-56 protocol cannot exchange data with an ISDN Access. However, since the ISDN Basic Rate Access protocol is implemented more extensively throughout the world, e.g., Japan, Australia, Europe, etc., it would be advantageous if were possible for ISDN devices to transmit and receive digital data over a Switched-56 Access.

While most local and long-distance telephone carriers in the United States offers Switched-56 digital telecommunications service, some Local Exchange Carriers do not offer ISDN Access. Switched-56 Access provides a user with a dial-up digital telecommunications capability for transmitting and receiving digital data either at 56 kilobits per second ("kbps") in a synchronous telecommunication mode, or 57.6 kbps in an asynchronous telecommunication mode. Switched-56 digital telecommunications service is widely used for low-bandwidth video conferencing to send and receive acceptable sound and pictures using only two Switched-56 telephone lines, i.e., transmitting and receiving at 112 kbps. Consequently, at present every major video conferencing equipment manufacturer incorporates a Switched-56 capability in its equipment. Analogous equipment is available for ISDN telecommunications throughout those regions of the world in which ISDN services are available.

Physically, a Switched-56 Access in accordance with the American Telephone and Telegraph Company's ("AT&T's") standard consists of one or two twisted pairs of wires which carry time compressed multiplexed ("TCM") digital signals to provide one full-duplex synchronous transmission path at a data rate of 56 kbps. Conversely, in accordance with a recommendation of an International Telegraph and Telephone Consultative Committee ("CCITT"), an ISDN Basic Rate Access provides two (2) full-duplex 64 kbps digital data channels, called channel B1 and channel B2, plus another full-duplex 16 kbps digital channel, called a D-channel. Under the CCITT recommendation, using time division multiplexing, all three of these digital data channels may be transmitted over a single pair of twisted wires, or over two pairs of twisted wires. The unrestricted data rate at which digital data may be transmitted over twisted pairs of wires in accordance with the ISDN recommendation for Basic Rate Access is 144 kbps, i.e. 64 kbps on each of the B1 and B2 channels plus 16 kbps on the D-channel.

As described in an AT&T Technical Reference entitled "Special Access Connections To The AT&T Network," TR 41458, published April 1990, while a Switched-56 Access actually transmits and receives bidirectional TCM digital data at 128 kbps (64 kbps being alternatively first transmitted and then received), the eighth bit of each octet is not available for data transmission because it is subject to over-writing if data is transmitted between telephone company switches. Thus, with a Switched-56 Access user data may occupy only bits 1 through 7 of each octet thereby providing an effective data transfer rate of only 56 kbps.

Within North America, telephone network switches capable of ISDN Basic Rate Access telecommunications must also be capable of concurrent Switched-56 telecommunications. To accommodate such concurrent operation, the CCITT Recommendations Q.930–Q.940 for ISDN Basic Rate Access permits a restricted mode of operation for each of the ISDN digital data channels B1 and B2. In accordance with these CCITT Recommendations, if an ISDN device exchanges digital data with a Basic Rate Access operating in restricted mode, then the data channel B1 or B2 transmits and receives data at an effective data rate of 56 kbps rather than at the unrestricted rate of 64 kbps. If an ISDN device operates in this restricted mode, it discards the eighth bit of every octet (eight bits) received from the Basic Rate Access. Analogously, an ISDN device transmitting digital data into a restricted ISDN Basic Rate Access uses only the first seven bits of each successive octet, and does not place any of the data being transmitted into the eighth bit of each octet. During set-up of an ISDN telephone call, signals transmitted from the telephone company switch notify the ISDN terminal equipment that digital data is to be transferred in restricted mode, or the terminal equipment placing a telephone call may notify the telephone company switch of that fact.

SUMMARY OF THE INVENTION

An object of the present invention is to provide an adaptor by which an ISDN telephone device capable of operating in the restricted mode of the ISDN protocol may exchange digital data with another similarly capable telephone device using only Switched-56 Accesses.

Another object of the present invention is to permit the operation of ISDN telephone devices in geographic regions in which the telephone company offers Switched-56 Access, but does not offer ISDN Basic Rate Access.

Another object of the present invention is to permit the operation of Switched-56 telephone devices in geographic regions in which the telephone company offers ISDN Basic Rate Access, but does not offer Switched-56 Access; or in which the telephone company charges more for two Switched-56 Accesses than for a single ISDN Basic Rate Access.

Briefly, the present invention in its preferred embodiment is an adaptor which permits an ISDN telephone device which receives and transmits digital data in accordance with CCITT Recommendations for ISDN Basic Rate Access to exchange digital data with a Switched-56 Access which transmits and receives the digital data in accordance with a Switched-56 protocol. The adaptor includes both an ISDN Basic Rate Access interface circuit, that provides an ISDN Basic Rate Access with which an ISDN telephone device may exchange the digital data in accordance with the CCITT Recommendations, and a Switched-56 Access interface circuit for interconnecting with a Switched-56 Access with which the adaptor may exchange digital data in accordance with the Switched-56 protocol. The adaptor also includes an adaptor bus for exchanging the digital data with the ISDN Basic Rate Access interface circuit, and with the Switched-56 Access interface circuit. The adaptor includes a random access memory coupled to the adaptor bus for storing the digital data during an interval between its receipt by one of the interface circuits and its transmission from the other interface circuit. A programmable digital signal processing circuit, included in the adaptor and coupled to the adaptor bus, controls the operation of the interface circuits and of the random access memory. The adaptor also includes a clock recovery circuit for synchronizing digital data transfers occurring between the ISDN Basic Rate Access interface circuit and the ISDN telephone device with the digital data transfers occurring between the Switched-56 Access interface circuit and the Switched-56 Access.

In its most preferred embodiment, the adaptor includes two Switched-56 Access interface circuits each of which exchanges digital data with the adaptor bus. Thus, by connecting each Switched-56 Access interface circuit included in the preferred adaptor to a Switched-56 Access, the ISDN telephone device may concurrently exchange digital data with both Switched-56 Accesses thereby permitting the ISDN telephone device to send and receive digital data at 112 kbps.

In an alternative embodiment, the clock recovery circuit synchronizes digital data transfers between the ISDN Basic Rate Access interface circuit and the Switched-56 Access interface circuit(s) rather than conversely as in the preferred embodiment. Accordingly, this alternative embodiment of the present invention permits a Switched-56 telephone device to transmit and receive digital data through an ISDN Basic Rate Access.

These and other features, objects and advantages will be understood or apparent to those of ordinary skill in the art from the following detailed description of the preferred embodiment as illustrated in the drawing figure.

DETAILED DESCRIPTION OF THE PREFERRED EMBODIMENT

Figure 1:
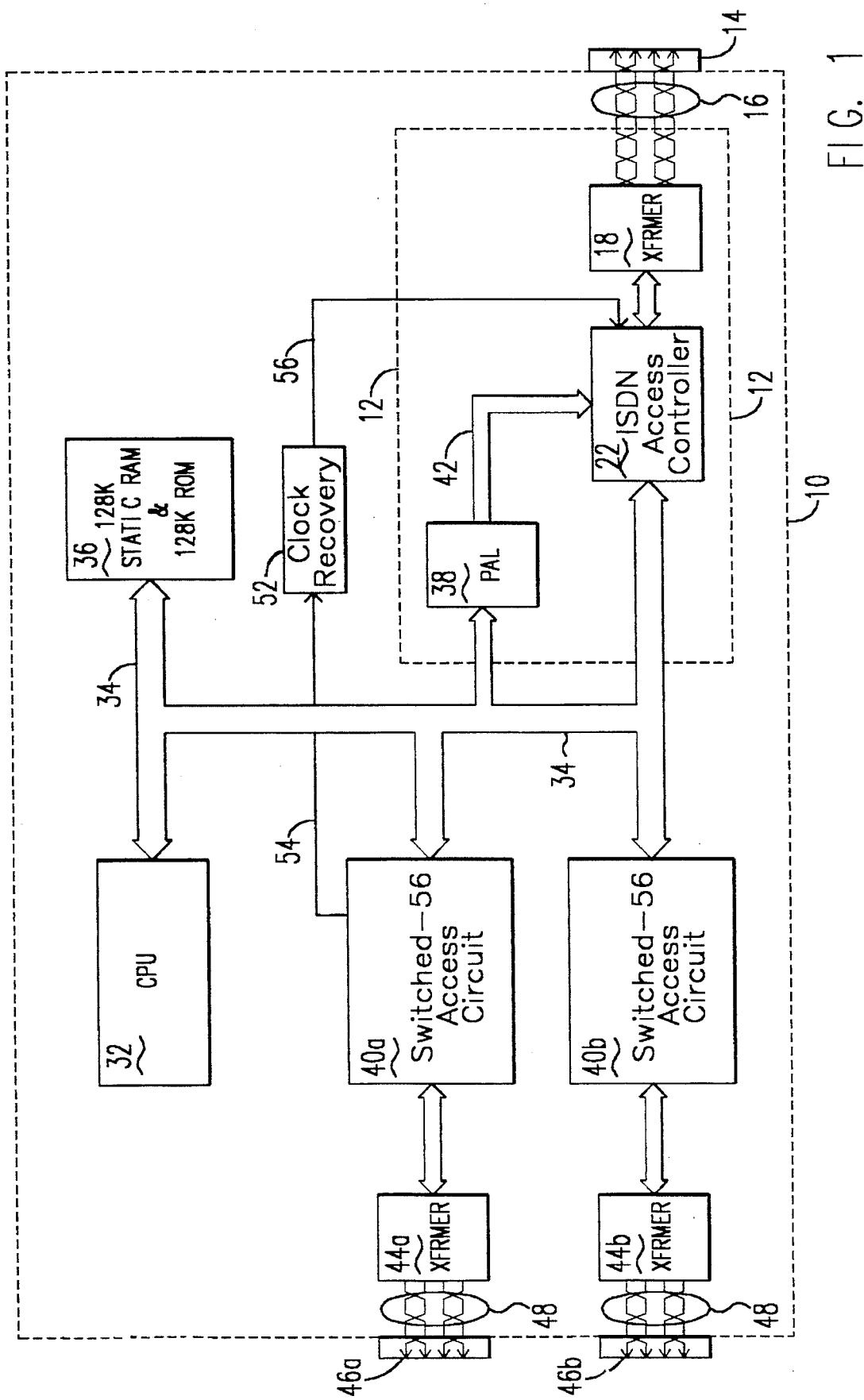
FIG. 1 is a functional block diagram depicting an adaptor in accordance with the most preferred embodiment of the present invention that includes two Switched-56 Access interface circuits and an ISDN Basic Rate Access interface circuit.

The functional block diagram of FIG. 1 depicts an adaptor in accordance with the present invention enclosed within a dashed line 10. The adaptor 10 includes an ISDN Basic Rate Access interface circuit 12 for exchanging digital data signals via an ISDN Basic Rate Access connector 14 with an ISDN telephone device (Not illustrated in FIG. 1.). Two pairs of electrical leads 16 couple the ISDN Basic Rate Access connector 14 to an ISDN isolation transformer circuit 18. The ISDN isolation transformer circuit 18 electrically isolates a PEB-2085 ISDN Subscriber Access Controller ("ISAC-S") integrated circuit 22, with which it exchanges digital data signals, from signals present on the electrical leads 16. The PEB-2085 22, which is marketed by Siemens Integrated Circuit Division, 2191 Laurelwood Rd., Santa Clara, Calif., is more completely described in a Siemens publication entitled "ICs for Communications," Ordering No. M12T021. The PEB-2085 22 provides an electronic interface for ISDN data transmission and reception over the two (2) B-channels and the D-channel of a four-wire ISDN Basic Rate Access. The electronic interface of the adaptor 10 provided by the PEB-2085 22 corresponds to that of a standard ISDN S/T interface which operates in accordance with the CCITT ISDN Basic Rate Access Recommendation. Accordingly, the adaptor 10 exchanges digital data with an ISDN telephone device in a manner that is equivalent to that of a standard ISDN S/T interface.

The PEB-2085 22 exchanges digital data with a digital signal processing circuit 32 via an adaptor bus 34. The digital signal processing circuit 32 is preferably a TMS320C25 Digital Signal Processor ("DSP"), which is marketed by Texas Instruments Incorporated ("TI"), Post Office Box 809066, Dallas, Tex. 75380-9066. The TMS320C25 is more completely described in a TI publication entitled "TMS320C2x User's Guide" copyright 1990, TI publication no. 164907-9721 revision B December 1990.

The adaptor bus 34 also connects the digital signal processing circuit 32 to a memory 36, a programmable array logic ("PAL") integrated circuit 38 included in the ISDN Basic Rate Access interface circuit 12, and to two (2) identical Switched-56 Access interface circuits 40a and 40b. An ISDN access control and status signal bus 42 couples the PAL 38 to the PEB-2085 22. The PAL 38 adapts various control signals transmitted by the digital signal processing circuit 32 for controlling the operation of the PEB-2085 22, and adapts various status signals transmitted by the PEB-2085 22 for receipt by the digital signal processing circuit 32. The memory 36 preferably includes 128 kilobytes of static RAM and 128 kilobytes of read only memory, electrically writable read only memory, or "Flash" memory ("ROM"). The computer program executed by the digital signal processing circuit 32 is stored in the ROM portion of the memory 36.

Each of the Switched-56 Access interface circuits 40a and 40b is a DSU/64 DSU/CSU Module marketed by HT Communications of Simi Valley, Calif. An isolation transformer circuit 44a or 44b, which may be physically incorporated into the DSU/64 DSU/CSU Module, couples each Switched-56 Access interface circuit 40a or 40b respectively to a Switched-56 access connector 46a or 46b via two pairs of electrical leads 48. Each isolation transformer circuit 44 electrically isolates the Switched-56 Access interface circuit 40a or 40b with which it exchanges digital data signals from signals present on a Switched-56 Access (Not illustrated in FIG. 1.). The DSU/64 is a synchronous/asynchronous DSU/CSU module which transmits and receives full-duplex digital data over leased-line Digital Data Service ("DDS") or over a dial-up Switched-56 Access at data rates up to 64 kbps depending upon the type of access. Each Switched-56 Access interface circuit 40a or 40b includes a microprocessor bus interface which allows the digital signal processing circuit 32 to efficiently configure each Switched-56 Access interface circuit 40a or 40b and monitor its status. Furthermore, a parallel data interface and HDLC support provided by the Switched-56 Access interface circuit 40a or 40b facilitate its exchange of digital data with Switched-56 Accesses, with the digital signal processing circuit 32, and with the memory 36.

Both Switched-56 and ISDN Accesses employ synchronous data transmission in which a timing signal is distributed from a central location outward throughout an entire telephone network to individual telephone devices. Accordingly, digital data transmitted from a telephone company switch located at its central office supplies the centralized timing signal to each of the Switched-56 Access interface circuits 40a and 40b included in the adaptor 10. Since data transfers between the adaptor 10 and the ISDN telephone device that is connected to the ISDN Basic Rate Access connector 14 must be synchronized with the timing signal that the adaptor 10 receives from a telephone company switch, the adaptor 10 includes a clock recovery circuit 52.

The clock recovery circuit 52 receives a timing signal from one of the Switched-56 Access interface circuit 40*a* or 40*b* via a clock input signal line 54, and retransmits that timing signal via a clock output signal line 56 to the PEB-2085 22. Depending upon precise details of the electronic circuits included in the Switched-56 Access interface circuit 40*a* or 40*b* and in the ISDN Basic Rate Access interface circuit 12, the clock recovery circuit 52 may be a separate circuit as depicted in FIG. 1, or the clock recovery circuit 52 may be incorporated into either the Switched-56 Access interface circuit 40*a* or 40*b* or into the ISDN Basic Rate Access interface circuit 12, or the clock recovery circuit 52 may be incorporated partially in both the Switched-56 Access interface circuit 40*a* or 40*b* and the ISDN Basic Rate Access interface circuit 12. Once again depending upon precise details of the electronic circuits included in the Switched-56 Access interface circuit 40*a* or 40*b* and in the ISDN Basic Rate Access interface circuit 12, the clock recovery circuit 52 may included a phase locked oscillator to insure proper synchronization with the timing signal received by either the Switched-56 access connector 46*a* or 46*b*.

The PEB-2085 22 uses the timing signal that it receives from the clock recovery circuit 52 via the clock output signal line 56 to synchronize signals between the PEB-2085 22 and the ISDN telephone device connected to the ISDN Basic Rate Access connector 14 with signals concurrently being received by the Switched-56 Access interface circuit 40*a* or 40*b*. The Switched-56 Access interface circuit 40*a* or 40*b* recovers this timing signal from the signal which it receives continuously from a telephone company switch via the Switched-56 access connector 46*a* or 46*b*. Since the Switched-56 Access interface circuit 40*a* or 40*b* receives the signal continuously from a telephone company switch even when the Switched-56 Access interface circuit 40*a* or 40*b* is not actively involved in exchanging digital data with a Switched-56 Access, e.g. while the ISDN telephone device is placing a telephone call, the clock recovery circuit 52 operates properly for providing a timing signal to the PEB-2085 22 so long as the Switched-56 Access interface circuit 40*a* or 40*b* from which the clock recovery circuit 52 receives the timing signal is physically connected to a Switched-56 Access.

Electrical power for circuits included in the adaptor 10 is provided by a separate power supply not illustrated in FIG. 1. Depending upon the particular type of ISDN telephone device connected to the ISDN Basic Rate Access connector 14, it may or may not be necessary for the ISDN S/T interface to supply an electrical current to the ISDN telephone device in addition to the digital data signals. If the ISDN S/T interface must supply an electrical current to the ISDN telephone device, then a commercially available power adaptor capable of supplying such an electrical current must be interposed into an electric cable which interconnects the ISDN Basic Rate Access connector 14 with the ISDN telephone device.

The adaptor 10 is facilely adapted for interconnecting a Switched-56 telephone device with an ISDN Basic Rate Access by interconnecting the timing signal in a direction opposite to that described above. For such a reversed operation of the adaptor 10 from that described thus far, the ISDN Basic Rate Access interface circuit 12 would supply the timing signal to the clock recovery circuit 52, which in turn would provide the timing signal to the Switched-56 Access interface circuit 40*a* or 40*b*, or to both the Switched-56 Access interface circuits 40*a* and 40*b*.

A multi-tasking computer program stored in the memory 36 and executed by the digital signal processing circuit 32 controls the overall operation of the ISDN Basic Rate Access interface circuit 12 and of the Switched-56 Access interface circuits 40*a* and 40*b* to effect exchanges of digital data between the ISDN Basic Rate Access connector 14 and the Switched-56 access connectors 46*a* and 46*b*. In particular, the computer program executed by the digital signal processing circuit 32 causes digital data to be temporarily stored into the RAM of the memory 36 during the interval between the instant at which it is supplied to the adaptor bus 34 respectively by the interface circuits 12, 40*a* and 40*b* and the instant at which it is received from the adaptor bus 34 respectively by the interface circuits 40*a*, 40*b* and 12.

Since both ISDN B-channels share the ISDN D-channel for telephone call control data such as call "set-up" and "tear-down" and for other call control data, for telephone call control data received from the Switched-56 Access the multi-tasking computer program executed by the digital signal processing circuit 32 must multiplex two streams of call control data into the single ISDN D-channel. Conversely, the multi-tasking computer program executed by the digital signal processing circuit 32 must de-multiplex telephone call control data received from the ISDN D-channel for separate transmission to the respective Switched-56 Accesses.

While the adaptor 10 must imitate a standard ISDN S/T interface, a multi-tasking computer program for execution by the digital signal processing circuit 32 may be readily implemented. Because the CCITT ISDN S/T interface is highly symmetric, the protocol for transmitting digital data signals from the ISDN S/T interface to an ISDN telephone device is substantially the same as the protocol for an ISDN telephone device's transmission of digital data signals to the ISDN S/T interface. Therefore, standard software available commercially from several different companies for use in ISDN telephone devices may be easily and simply modified for execution by the digital signal processing circuit 32 so the digital signal processing circuit 32 appropriately controls the operation of the ISDN Basic Rate Access interface circuit 12 in accordance with the restricted mode of operation of the ISDN Basic Rate Access protocol.

Since the Switched-56 Access interface circuits 40*a* and 40*b* are self contained units capable of independently interfacing with Switched-56 Accesses, the computer program executed by the digital signal processing circuit 32 only provides high level call control data to the Switched-56 Access interface circuits 40*a* and 40*b*. For example, the computer program executed by the digital signal processing circuit 32 need only send the Switched-56 Access interface circuit 40*a* or 40*b* data directing it to dial a telephone number and the telephone number, and the Switched-56 Access interface circuit 40*a* or 40*b* will thereafter properly perform that entire function without further intervention by the computer program executed by the digital signal processing circuit 32.

Since ISDN digital data occupies separate channels B1 and B2, there is a one-to-one correspondence between digital data exchanged between the Switched-56 access connector 46*a* or 46*b* of the adaptor 10 and a Switched-56 Access, and digital data exchanged over a single ISDN B-channel operating in restricted mode and the ISDN telephone device connected to the ISDN Basic Rate Access connector 14. Accordingly, the computer program executed by the digital signal processing circuit 32 need not multiplex or de-multiplex the digital data as it must for the call control data.

Although the present invention has been described in terms of the presently preferred embodiments, it is to be understood that such disclosure is purely illustrative and is not to be interpreted as limiting. For example, while an AT&T Switched-56 physical interface and a Northern Telecom Switched-56 physical interface employs a four (4) wire connection such as that depicted in FIG. 1, an alternative AT&T Switched-56 physical interface employs only a two (2) wire connection. Thus an adaptor 10 in accordance with the present invention may employ a two (2) wire interface rather than the four (4) wire interface depicted in FIG. 1. Correspondingly, while the preferred embodiment of the adaptor 10 has been described as employing a pair of Switched-56 Access interface circuits 40a and 40b, an adaptor 10 in accordance with the present invention may employ only a single Switched-56 Access interface circuit 40a or 40b. However, an adaptor 10 having only a single Switched-56 Access interface circuit 40a or 40b would be capable of exchanging digital data at a rate that is one-half of that for the preferred embodiment of the adaptor 10, i.e., 56 kbps rather than 112 kbps. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. An adaptor for permitting an ISDN telephone device which receives and transmits digital data in accordance with CCITT Recommendations for ISDN Basic Rate Access to exchange digital data with a Switched-56 Access to a telephone network which transmits and receives the digital data in accordance with a Switched-56 protocol, said adaptor comprising:

an ISDN Basic Rate Access interface circuit adapted for providing an ISDN Basic Rate Access with which an ISDN telephone device exchanges digital data in accordance with the CCITT Recommendations for ISDN Basic Rate Access;

an adaptor bus for exchanging the digital data with said ISDN Basic Rate Access interface circuit;

a Switched-56 Access interface circuit adapted for interconnecting with a Switched-56 Access to the telephone network with which said adaptor exchanges digital data in accordance with the Switched-56 protocol, said Switched-56 Access interface circuit also exchanging such digital data with said adaptor bus included in said adaptor;

a random access memory coupled to said adaptor bus for storing the digital data respectively received by said ISDN Basic Rate Access and Switched-56 Access interface circuits, and for respectively supplying the stored digital data for transmission by said ISDN Basic Rate Access and Switched-56 Access interface circuits;

a programmable digital signal processing circuit coupled to said adaptor bus for controlling operation of said ISDN Basic Rate Access and Switched-56 Access interface circuits and of said random access memory; and a clock recovery circuit for synchronizing the digital data transfers occurring between said ISDN Basic Rate Access interface circuit and the ISDN telephone device with the digital data transfers occurring between said Switched-56 Access interface circuit and the Switched-56 Access.

2. The adaptor of claim 1 further comprising a second Switched-56 Access interface circuit that also exchanges the digital data with said adaptor bus and that is adapted for interconnecting said adaptor with a second Switched-56 Access to the telephone network, whereby said ISDN telephone device may concurrently exchange digital data with two Switched-56 Access.

3. An adaptor for permitting a Switched-56 telephone device which receives and transmits digital data in accordance with a Switched-56 protocol to exchange digital data with an ISDN Basic Rate Access to a telephone network which transmits and receives the digital data in accordance with CCITT Recommendations for ISDN Basic Rate Access, said adaptor comprising:

a Switched-56 Access interface circuit adapted for providing a Switched-56 Access with which a Switched-56 telephone device exchanges digital data in accordance with the Switched-56 protocol;

an adaptor bus for exchanging the digital data with said Switched-56 Access interface circuit;

an ISDN Basic Rate Access interface circuit adapted for interconnecting with an ISDN Basic Rate Access to the telephone network with which said adaptor exchanges digital data in accordance with the CCITT Recommendations for ISDN Basic Rate Access, said ISDN Basic Rate Access interface circuit also exchanging such digital data with said adaptor bus included in said adaptor;

a random access memory coupled to said adaptor bus for storing the digital data respectively received by said ISDN Basic Rate Access and Switched-56 Access interface circuits, and for respectively supplying the stored digital data for transmission by said ISDN Basic Rate Access and Switched-56 Access interface circuits;

a programmable digital signal processing circuit coupled to said adaptor bus for controlling operation of said ISDN Basic Rate Access and Switched-56 Access interface circuits and of said random access memory; and a clock recovery circuit for synchronizing the digital data transfers occurring between said Switched-56 Access interface circuit and the Switched-56 telephone device with the digital data transfers occurring between said ISDN Basic Rate Access interface circuit and the ISDN Basic Rate Access.

4. The adaptor of claim 3 further comprising a second Switched-56 Access interface circuit that also exchanges the digital data with said adaptor bus and that is adapted for interconnecting said adaptor with a Switched-56 telephone device, whereby said adaptor may concurrently provide two Switched-56 Access.

* * * * *